(12) United States Patent
White et al.

(10) Patent No.: US 10,072,934 B2
(45) Date of Patent: Sep. 11, 2018

(54) PASSIVE MARKING ON LIGHT FIXTURE DETECTED FOR POSITION ESTIMATION

(71) Applicant: ABL IP HOLDING LLC, Conyers, GA (US)

(72) Inventors: Sean P. White, Reston, VA (US); Daniel M. Megginson, Fairfax, VA (US); David P. Ramer, Reston, VA (US); Jack C. Rains, Jr., Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 62 days.

(21) Appl. No.: 14/996,948

(22) Filed: Jan. 15, 2016

(65) Prior Publication Data
US 2017/0205237 A1    Jul. 20, 2017

(51) Int. Cl.
| | |
|---|---|
| *G01C 21/20* | (2006.01) |
| *F21V 5/04* | (2006.01) |
| *F21V 23/02* | (2006.01) |
| *G06K 9/00* | (2006.01) |
| *G06K 9/22* | (2006.01) |

(52) U.S. Cl.
CPC .............. *G01C 21/206* (2013.01); *F21V 5/04* (2013.01); *F21V 23/02* (2013.01); *G06K 9/00671* (2013.01); *G06K 9/22* (2013.01)

(58) Field of Classification Search
None
See application file for complete search history.

(56) References Cited

U.S. PATENT DOCUMENTS

| | | |
|---|---|---|
| 5,414,474 A | 5/1995 | Kamada et al. |
| 6,226,418 B1 | 5/2001 | Miller et al. |
| 6,470,264 B2 | 10/2002 | Bide |
| 6,493,458 B2 | 12/2002 | Yasui et al. |
| 6,924,741 B2 | 8/2005 | Tamayama et al. |
| 7,613,361 B2 | 11/2009 | Anabuki et al. |
| 7,657,065 B2 | 2/2010 | Kotake et al. |
| 7,991,194 B2 | 8/2011 | Kim et al. |
| 8,259,997 B2 | 9/2012 | Audet et al. |
| 8,369,578 B2 | 2/2013 | Arnaud et al. |
| 9,020,191 B2 | 4/2015 | Gupta et al. |

(Continued)

FOREIGN PATENT DOCUMENTS

| | | |
|---|---|---|
| WO | 2011163454 A1 | 12/2011 |
| WO | 2015049614 A1 | 4/2015 |

OTHER PUBLICATIONS

Rajagopal, Niranjini, Patrick Lazik, and Anthony Rowe. "Visual light landmarks for mobile devices." Proceedings of the 13th international symposium on Information processing in sensor networks. IEEE Press, 2014.*

(Continued)

*Primary Examiner* — Michelle M Entezari

(74) *Attorney, Agent, or Firm* — RatnerPrestia

(57) ABSTRACT

An identification marking is incorporated into a light fixture to provide a uniquely identifiable light fixture. The identification marking is humanly imperceptible. Location information for the uniquely identifiable light fixture is obtained by a mobile device after identifying the light fixture based on the identification marking. Location of the mobile device is estimated based on the obtained location information of the uniquely identifiable light fixture.

31 Claims, 9 Drawing Sheets

(56) References Cited

U.S. PATENT DOCUMENTS

| | | | |
|---|---|---|---|
| 9,509,402 B2* | 11/2016 | Ryan | H04B 10/116 |
| 9,876,568 B2* | 1/2018 | Ryan | H04B 10/116 |
| 2002/0031242 A1 | 3/2002 | Yasui et al. | |
| 2009/0157309 A1* | 6/2009 | Won | G01C 21/20 |
| | | | 701/533 |
| 2010/0165116 A1* | 7/2010 | Hsieh | G06T 7/73 |
| | | | 348/187 |
| 2011/0081919 A1 | 4/2011 | Das et al. | |
| 2011/0128388 A1* | 6/2011 | Pai | G01B 11/03 |
| | | | 348/187 |
| 2011/0156925 A1* | 6/2011 | Lee | H04B 10/1149 |
| | | | 340/905 |
| 2011/0187704 A1 | 8/2011 | Chen et al. | |
| 2011/0246148 A1 | 10/2011 | Gupta et al. | |
| 2011/0282897 A1 | 11/2011 | Li et al. | |
| 2012/0166077 A1 | 6/2012 | Herzog et al. | |
| 2012/0176491 A1 | 7/2012 | Garin et al. | |
| 2012/0285024 A1* | 11/2012 | Miller | G01C 11/04 |
| | | | 33/1 A |
| 2013/0048707 A1 | 2/2013 | Do | |
| 2013/0141554 A1 | 6/2013 | Ganick et al. | |
| 2013/0211715 A1* | 8/2013 | Bae | G01S 19/48 |
| | | | 701/469 |
| 2014/0084050 A1* | 3/2014 | Calvarese | G01S 5/163 |
| | | | 235/375 |
| 2014/0161358 A1* | 6/2014 | O'Haire | G06K 9/3216 |
| | | | 382/199 |
| 2015/0036016 A1 | 2/2015 | Jovicic | |
| 2015/0373503 A1* | 12/2015 | Jovicic | G01S 5/0252 |
| | | | 455/456.1 |
| 2016/0044301 A1* | 2/2016 | Jovanovich | G01S 17/89 |
| | | | 348/50 |
| 2016/0122038 A1* | 5/2016 | Fleischman | G06T 7/73 |
| | | | 701/2 |
| 2017/0041070 A1* | 2/2017 | Ryan | H04B 10/116 |

OTHER PUBLICATIONS

Punarjay Chakravarty, "Vision-based Indoor Localization of a Motorized Wheelchair," Technical Report MECSE-25-2005, Department of Electrical and Computer Systems Engineering, Monash University, Clayton, VIC 3800, Australia.

* cited by examiner

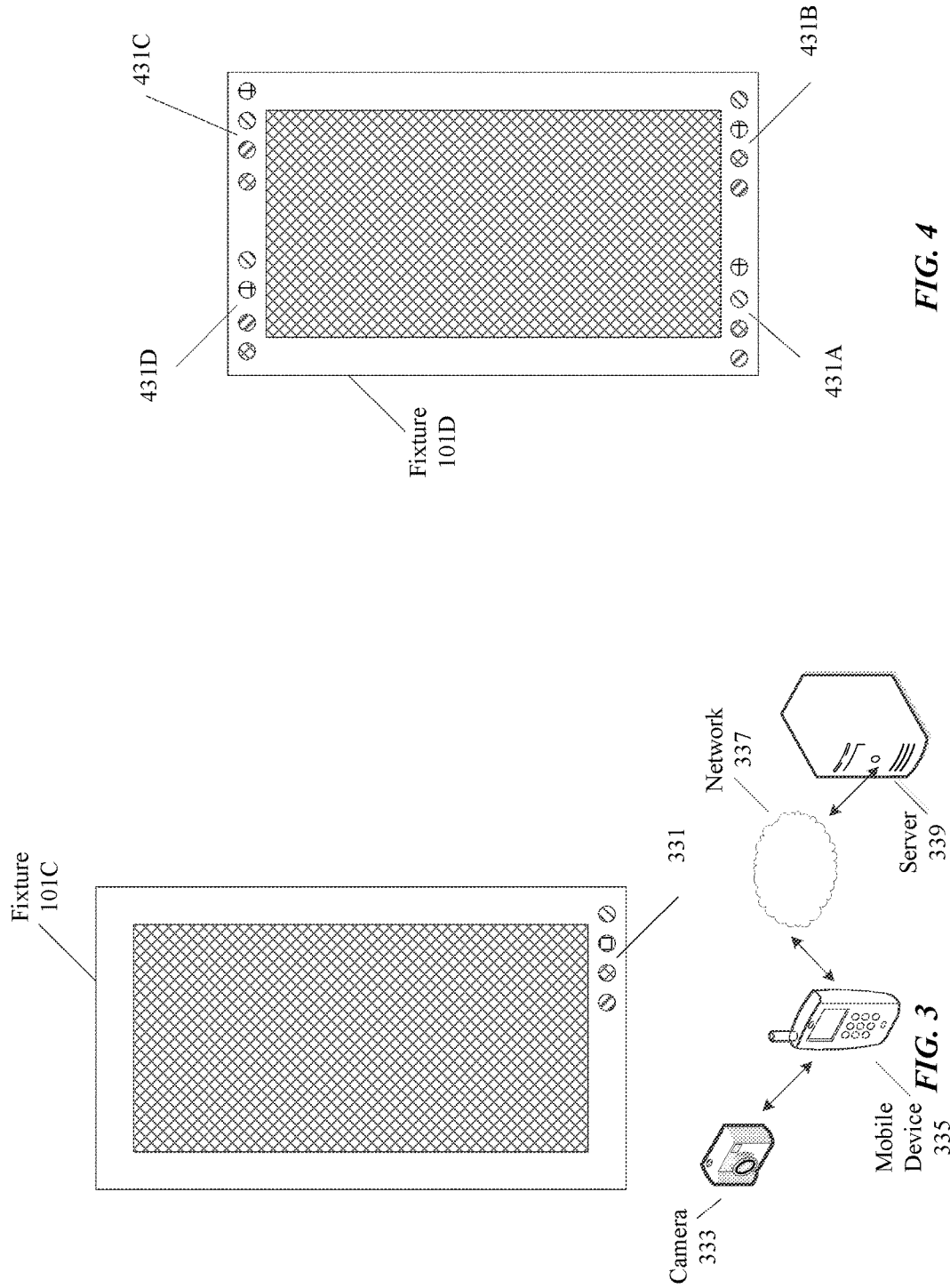

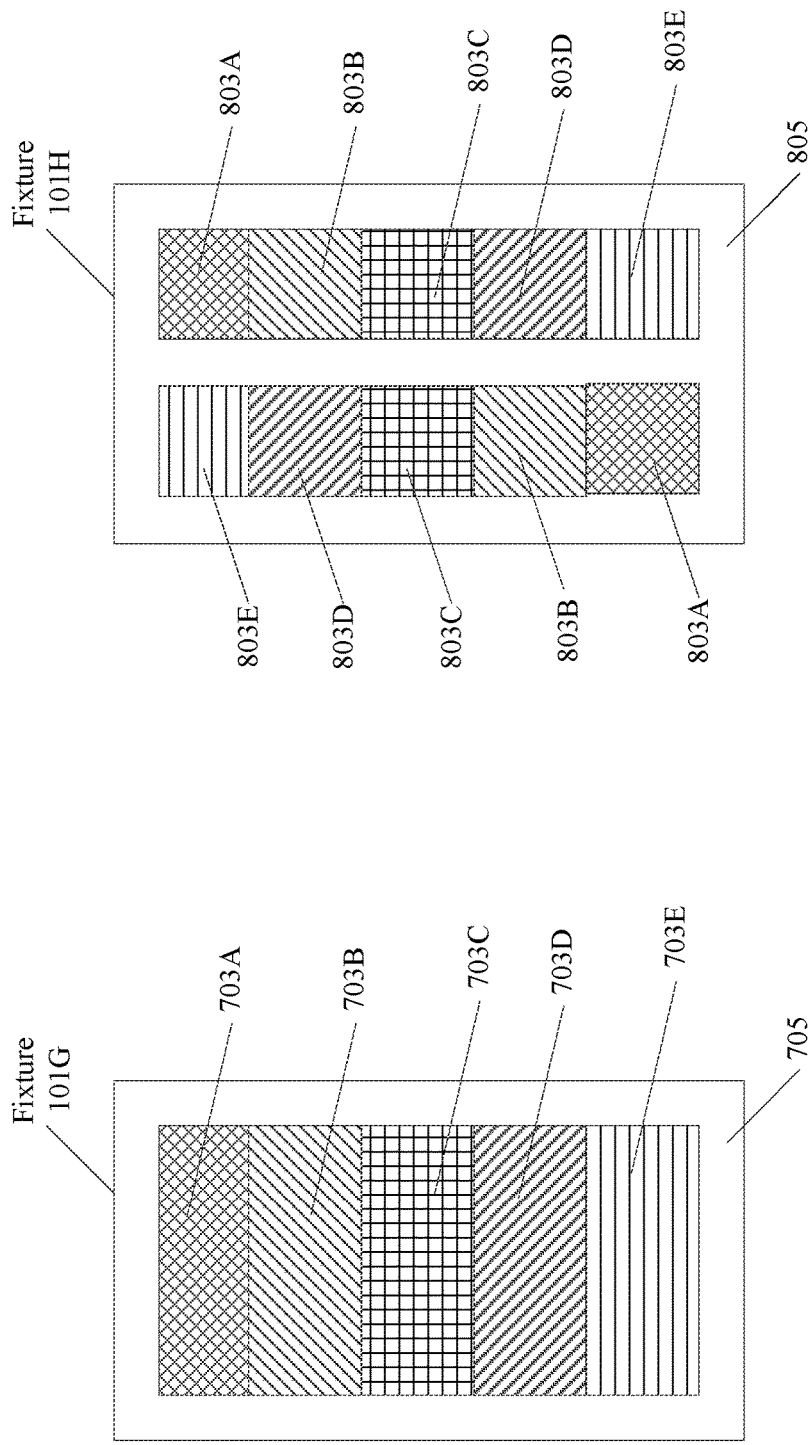

PASSIVE MARKING ON LIGHT FIXTURE
DETECTED FOR POSITION ESTIMATION

TECHNICAL FIELD

The present subject matter relates to techniques and equipment to capture one or more passive markings on a light fixture installed within a space, for example, for use in estimation of position.

BACKGROUND

In recent years, the use of mobile devices, particularly smartphones and tablets, has grown significantly. An increasing use for a mobile device includes identifying a current location of the mobile device and utilizing information about the identified location to assist a user of the mobile device. For example, the mobile device may display a map of an area in which the mobile device user is currently located as well as an indication of the user's location on the map. In this way, the user may utilize the mobile device as a navigational tool, for example.

Traditionally, a mobile device may use location identification services such as Global Positioning System (GPS) or cellular communications to help identify a current location of the mobile device. However, GPS and cellular communications may not provide sufficient information when the mobile device is located within a building. More recently, the mobile device may use Wi-Fi and/or other radio frequency (RF) technologies (e.g., Bluetooth, Near-Field Communications (NFC), etc.) to help identify the current location of the mobile device within a building. But such Wi-Fi and RF based solutions may be slow and may require that additional infrastructure, such as hotspots or beacons, be added within the building. This additional infrastructure has additional costs that may not be outweighed by any benefit provided to the user of the mobile device.

Hence a need exists for providing improved location estimation services within a building with minimal delay and without requiring additional infrastructure.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 is a simplified block diagram of an example of a uniquely identifiable light fixture as well as elements of an example of a system that may utilize the uniquely identifiable light fixture to facilitate identification of a current location of a mobile device.

FIG. 4 is a simplified block diagram of an example of an alternate uniquely identifiable light fixture.

FIG. 7 is a simplified block diagram of an example of still another alternate uniquely identifiable light fixture.

FIG. 8 is a simplified block diagram of an example of a further alternate uniquely identifiable light fixture.

DETAILED DESCRIPTION

Figure 1:
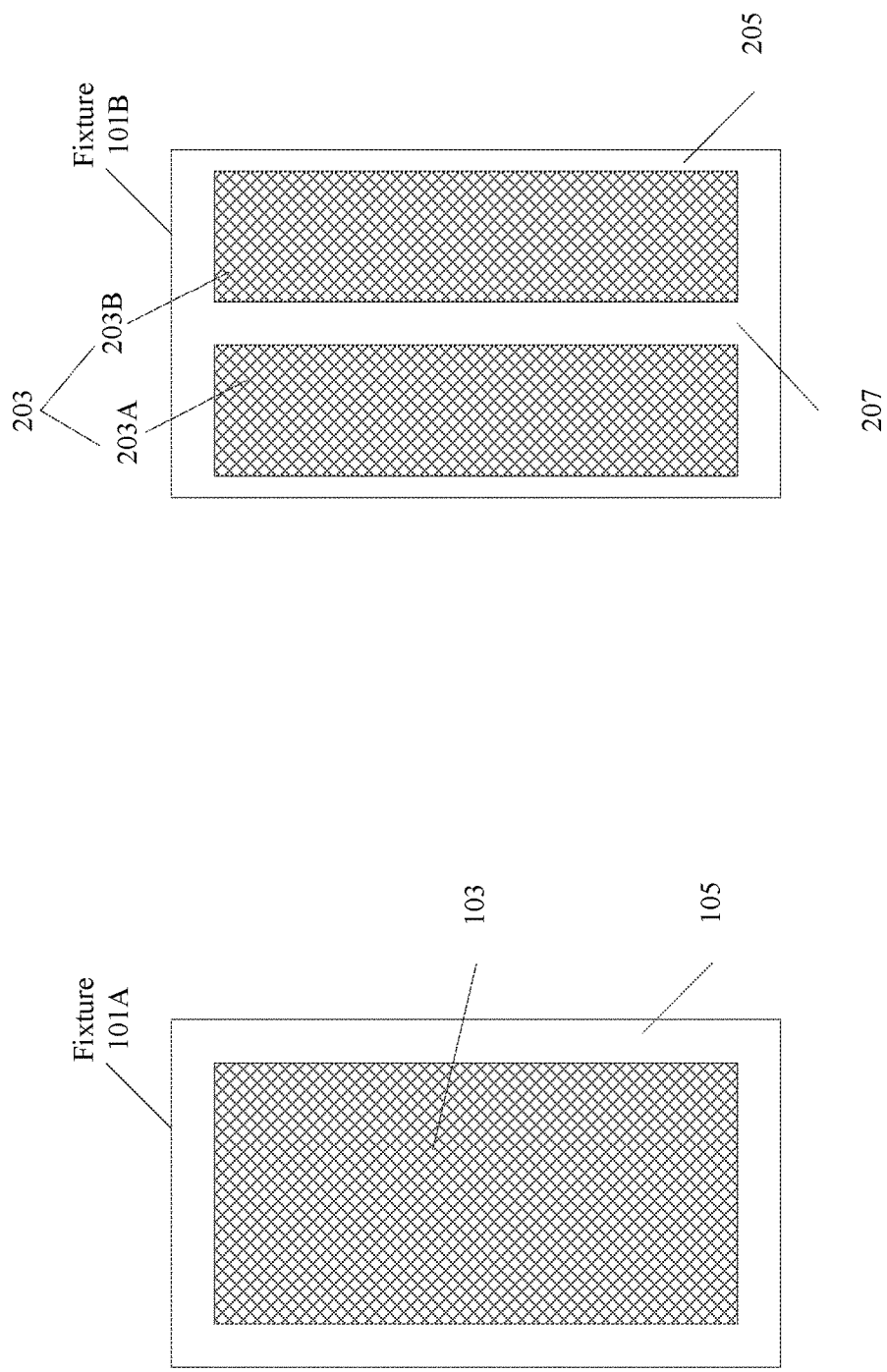
FIG. 1A is a simplified block diagram of an example of a light fixture.
FIG. 1B is a simplified block diagram of an example of an alternate light fixture.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As discussed briefly in the background, Wi-Fi and RF based approaches have been developed in order to facilitate estimation of a current location of a mobile device. However, these approaches have significant costs that may outweigh any potential benefits. An additional approach to facilitate estimation of a current location of a mobile device has been developed that involves active interaction between a light fixture and the mobile device. More specifically, light produced by a light source within the light fixture is modulated with information such that the information is delivered to the mobile device. Such information, for example, includes an identifier of the light fixture or other data that corresponds to or otherwise represents a location of the light fixture. Based on the location of the light fixture, the mobile device may estimate a current location for the mobile device. Such visible light communication (VLC) based solution, however, requires that the light fixture be on or otherwise capable of producing light to be modulated. In addition, VLC requires that the mobile device is able to identify and interpret any information delivered as part of the modulated light. If the light source within the light fixture is unable to produce light (e.g., light source is powered off or has failed) or the mobile device is unable to identify or interpret the modulated light, VLC is useless in facilitating a current location estimate of the mobile device. To overcome the shortcomings of the active approach to identifying a light fixture via VLC, an alternative passive approach to identifying a light fixture has been developed.

The various examples disclosed herein relate to uniquely identifying a light fixture using a passive approach in order to facilitate location estimation of a mobile device. The various examples disclosed herein also relate to a process of utilizing a uniquely identifiable light fixture to facilitate estimating a current location of a mobile device.

In one example, a light fixture is configured to contain a watermark. The watermark is, for example, a humanly imperceptible identification marking such as a pattern or other alteration of the light fixture that does not negatively impact performance of the light fixture and is otherwise unnecessary for the light fixture to perform an intended or expected lighting function. Such pattern or other alteration may be predetermined or random in nature. Humanly imperceptible is intended to mean that, while a user may (or may not) view or otherwise see the identification marking, the user will not perceive the marking as performing an identification function. That is, unlike a bar code or quick response (QR) code which is easily perceived as identifying an item, the watermark in various examples below is not readily perceivable as identifying a light fixture. The watermark, however, is detectable by processing of an image of the marked light fixture.

The identification marking is, in one example, a single element. Alternatively, the identification marking includes, for example, multiple elements located either in close proximity or distributed at various locations across the light fixture. In yet another example, the identification marking includes multiple elements located in close proximity as well as an additional element located elsewhere on the light fixture. In still another example, the identification marking includes multiple groups of elements located across the light fixture with each group of elements including multiple elements located in close proximity.

While the identification marking may take any of a number of forms for any one light fixture, the identification marking will change for each light fixture within a set of light fixtures such that each changed identification marking uniquely identifies one light fixture from within the set of light fixtures (unique at least within some area of interest, e.g. a building or campus). For example, given an identification marking including a single element, that single element will change from one light fixture to the next light fixture within the set of fixtures, e.g., at a particular facility such that each light fixture at the facility is uniquely identified from within the set of light fixtures. As a further example, given a set of three light fixtures and a single element identification marking, a first light fixture A may include a circle with diagonal lines as an identification marking; a second light fixture B may include a circle with horizontal lines as an identification marking; and a third light fixture C may include a circle with vertical lines as an identification marking. In this way, each of light fixture A, light fixture B and light fixture C may be uniquely identified from within the set of three light fixtures.

It should be noted that light fixtures are common within an indoor space, such as a retail area within a retail location or offices within an office building. It should also be noted that location information for each lighting fixture within the indoor space is either readily available or may be obtained. As such, given a known location for a uniquely identifiable light fixture, a process may be performed to estimate, at least in relation to the uniquely identifiable light fixture, a current location for a mobile device. A modern mobile device typically includes one or more image sensors, e.g. cameras, which may be used in position estimation and/or related operations. For example, a mobile device may capture an image including the uniquely identifiable light fixture. As part of image processing in this example, the uniquely identifiable light fixture is isolated within the image. Once isolated, the isolated image of the uniquely identifiable light fixture is analyzed to determine, for example, whether the light fixture includes a watermark and/or whether the included watermark includes multiple elements/tags. Once the watermark is determined, the light fixture may be identified based on the watermark found in the image of the fixture; and a location of the light fixture may be determined based on the identification of the particular fixture. In this example, a location of the mobile device may then be estimated based on the location of the uniquely identifiable light fixture.

Reference now is made in detail to the examples illustrated in the accompanying drawings and discussed below. FIG. 1A illustrates one example of a light fixture 101A that may be installed within a space. Although the light fixture is depicted with a rectangular shape, this is only for simplicity and the processes described herein may be utilized with a light fixture of any one of various shapes and/or sizes. Furthermore, when multiple light fixtures are utilized to facilitate location determination of a mobile device as described herein, each light fixture may be of a shape and/or size consistent with all of the multiple light fixtures or may be of a differing shape and/or size. In the example depicted in FIG. 1A, light fixture 101A includes an outer rim or bezel 105 and a lens or gradient 103, e.g. for distributing output light. In general, lens or gradient 103 provides a covering for a light source and/or lighting device within the light fixture 101A. That is, light generated by a light source and/or lighting device within the light fixture 101A will pass through lens or gradient 103 in order to provide general illumination to the space. The actual source of light within the fixture may or may not be readily discernable to an observer through the lens or gradient 103. The actual source often is a powered source of artificial illumination but may be a source for collecting daylight from outside a building.

FIG. 1B illustrates an alternate example of a light fixture 101B. In this alternate example, lens or gradient 203 is divided into two halves 203A, 203B separated by an inner rim 207. Lens or gradient 203 is also surrounded by outer rim 207. Once again, such equal division of lens or gradient 203 into two halves 203A, 203B is only for simplicity and lens or gradient 203 may be divided into any number of portions with each portion being consistent in shape and/or size or each portion being different in shape and/or size.

Figure 2:
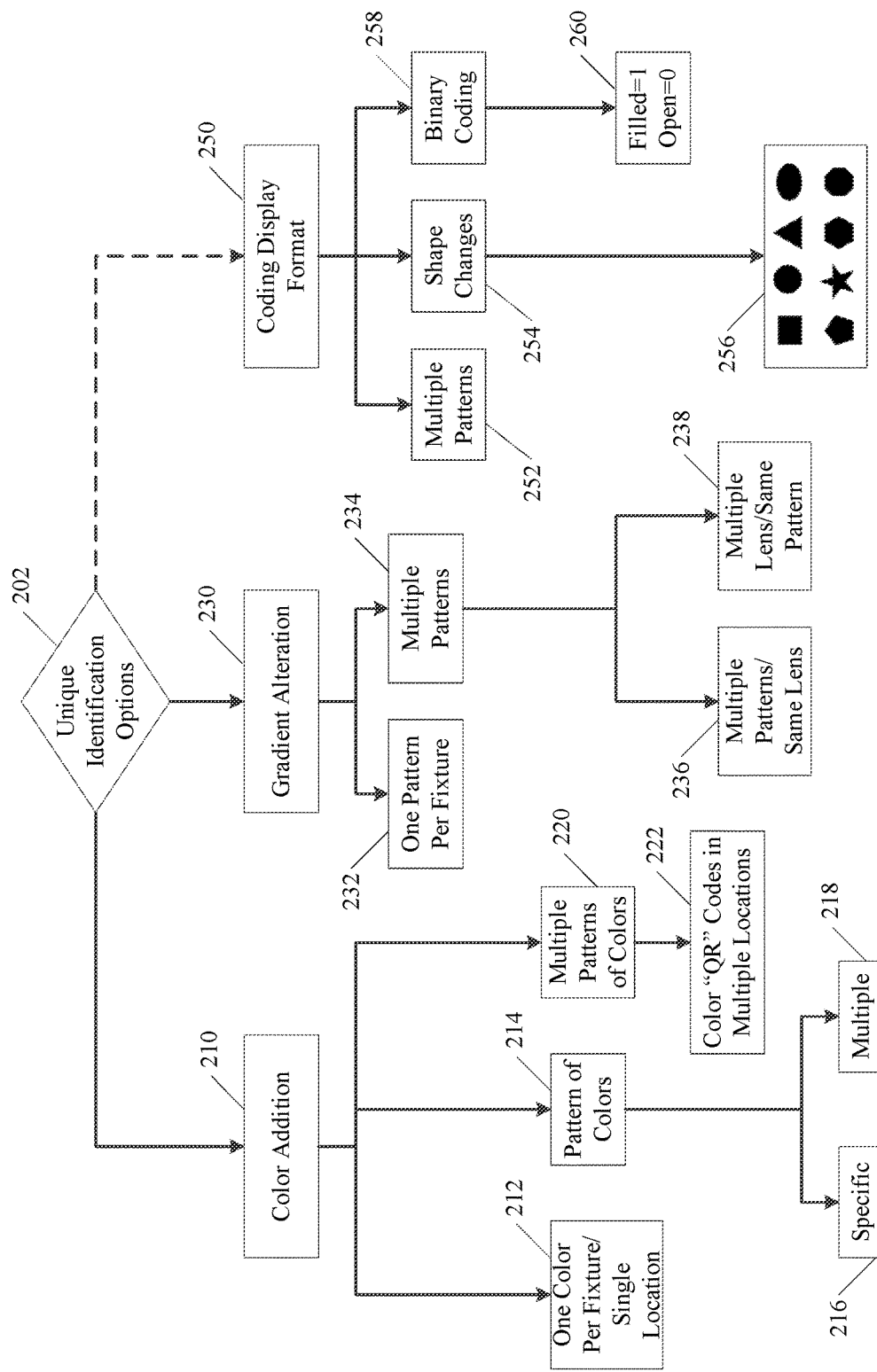
FIG. 2 is a chart illustrating various unique identification options that may be used to facilitate identification of a light fixture.

FIG. 2 depicts a chart of various examples of unique identification options 202 while FIGS. 3-8 illustrate various examples of alternative light fixtures incorporating one or more unique identification options 202. Keeping our focus on FIG. 2, unique identification options 202 include, for example, color addition 210 and gradient alteration 230. Although not necessarily providing a form of markings, coding display format 250 is included in FIG. 2 with a dashed line to unique identification options 202 because coding display format 250 provides a definition or otherwise further clarification as to how various options are to be interpreted or understood. Of note, as described in greater detail below, a uniquely identifiable light fixture may incorporate any one or some combination of unique identification options 202 in order to enable unique identification of the light fixture.

Color addition 210 involves adding color to the otherwise standard color of an otherwise standard light fixture. As discussed above and further below, color addition 210 may, in various examples, not be readily perceptible by a human observer. That is, instead of adding a color that is in stark contrast to the otherwise standard color of an otherwise standard light fixture, the added color may, for example, be a shade variation of the otherwise standard color of the otherwise standard light fixture. At the same time, color addition 210 remains optically detectable by processing of an image captured by a camera of a mobile device. Color addition 210 includes, for example, one color per fixture in a single location 212, a pattern of colors 214 and multiple patterns of colors 220. The pattern of colors 214 may be in a specific location 216 or may occur at multiple locations 218. The multiple patterns of colors 220 may represent color "QR" codes in multiple locations 222.

Gradient alteration 230 involves modification or alteration to the otherwise standard lens or gradient of an otherwise standard light fixture, such as lens or gradient 103, 203 of light fixtures 101A, 101B. For example, an otherwise standard lens or gradient 103 or 203 may be altered such that light emitted from the light fixture forms a pattern of shapes and/or sizes. Alternatively, or in addition, light may be emitted in various shades and/or intensities across the surface of the lens or gradient. As with color addition 210, gradient alteration 230 may, in various examples, not be readily perceptible to a human observer. For example, variations in the intensity of light emitted across the lens or gradient may be sufficiently subtle such that a casual observer is unaware of any variation. Gradient alteration 230 includes, for example, one pattern per fixture 232 and multiple patterns 234. Multiple patterns 234 may include multiple patterns within the same lens 236 or multiple lenses each with the same pattern 238. Although not shown, multiple patterns 234 may also include multiple lenses each with a different pattern or even multiple different patterns.

While coding display format 250 provides some independent forms of uniquely identifying a light fixture, coding display format 250 may also be incorporated with color addition 210 and/or gradient alteration 230 to provide for a wider range of unique identifications. For example, while each light fixture within a set of light fixtures may incorporate color addition 210 by including a pattern of colors 214 at a specific location 216, coding display format 250 may provide context to how the pattern of colors 214 changes across light fixtures within the set of light fixtures. That is, while light fixture A includes one pattern of colors and light fixture B includes a different pattern of colors, coding display format 250 defines or otherwise influences, for example, how the two patterns of colors differ between light fixture A and light fixture B such that each light fixture is uniquely identifiable.

Coding display format 250 includes, for example, multiple patterns 252, shape changes 254 and binary coding 258. Shape changes 254 may include a number of different shapes, such as depicted at 256, and may define or otherwise influence how shapes differ between each of a set of light fixtures. That is, shape changes 254 may define that a first watermark incorporating a pattern of colors 214 takes a first shape to uniquely identify a first light fixture A while a second watermark also incorporating a pattern of colors 214 takes a second shape to uniquely identify a second light fixture B. Similarly, binary coding 258 may include an interpretation key, such as depicted at 260, that defines how individual elements or tags within a watermark are to be interpreted. While numerous examples of various unique identification options 202 have been individually depicted, this is only for simplicity and unique identification options 202 may be intermixed in various forms to provide an even wider range of unique identifications.

FIG. 3 illustrates an example of a light fixture 101C that incorporates an example of a watermark 331. FIG. 3 also depicts an example of a system that may utilize light fixture 101C to facilitate location determination of a mobile device, such as mobile device 335. As with light fixtures depicted in previous FIGS. 1A-1B and subsequent FIGS. 4-6, light fixture 101C is depicted with a rectangular shape and a single lens or gradient, but this is only for simplicity. In the example of FIG. 3, watermark 331 includes four circles with each circle having a different pattern. Once again, as discussed above, while FIG. 3 depicts light fixture 101C with watermark 331 that is visible to the reader of this disclosure, this is only for simplicity in explanation and teaching. In practice, while watermark 331 may include one or more discreet shapes each with similar or dissimilar patterns, such shapes and patterns will be relatively imperceptible to most human observers. Of note, while FIG. 3 depicts a single light fixture 101C, it should be understood that, given a set of light fixtures, changes to watermark 331 depicted on other light fixtures within the set allow each light fixture to be uniquely identified, at least in relation to other light fixtures within the set.

In the system of FIG. 3, camera 333, for example, will take a picture of fixture 101C and such captured image will be processed by software and/or hardware processing elements of the mobile device 335. Although camera 333 and mobile device 335 are depicted as separate elements, this is only for simplicity and it is well known that various mobile devices include or otherwise incorporate a camera or image sensor. Thus, in an alternate example (e.g., FIGS. 10 and 11), a mobile device may utilize an included or otherwise incorporated camera or other image sensor to capture a picture including light fixture 101C. Furthermore, although mobile device 335 is depicted as a mobile or cellular phone, this is also only for simplicity. The term "mobile device" is intended to incorporate any device capable of being moved through a space, such as a drone, a wearable device, a tablet, a notebook/laptop computer or a desktop computer (e.g., a desktop computer positioned on a cart or otherwise configured to be moved). In addition, while various examples herein refer to a "user", this is also only for simplicity and the term "user" is intended to include both human and non-human actors (e.g., animal, robot, cyborg) as well as other forms of process controlling automata (e.g., processor controlling a self-controlling drone based on predetermined instructions).

Mobile device 335, in one example, processes a captured image including light fixture 101C. Such processing includes, for example, isolating light fixture 101C within the captured image, analyzing the isolated portion of the image containing light fixture 101C to determine if a watermark is included and analyzing watermark 331 detected in the image to determine an identification of light fixture 101C. Although some or all of such processing may be performed directly by mobile device 335, alternatively some or all of such processing may be performed by server 339 by transferring the captured image to server 339 via network 337.

Once an identification of light fixture 101C is determined based on watermark 331, such identification is utilized, for example, to determine a location of light fixture 101C within a space. For example, mobile device 335, upon entering the space, may download or otherwise acquire a map or other data that includes identifications for each or some number of light fixtures within the space as well as location information corresponding to the light fixtures. In this example, mobile device 335 refers to such map or other data to retrieve location information for light fixture 101C based on the identification corresponding to watermark 331.

In an alternate example, mobile device 335 transfers the determined identification to server 339 via network 337. In this alternate example, server 339 includes a database or other collection of data that incorporates identifications for each or some number of light fixtures within the space as well as location information for corresponding light fixtures. Server 339, based on the transferred identification, retrieves location information for light fixture 101C and transfers such location information back to mobile device 335 via network 337. It should be noted that, while FIG. 3 depicts a single network 337 and a single server 339, this is only for simplicity. Server 339 may include a plurality of servers or otherwise be based on distributed computing, such as in cloud computing and/or fog computing and network 337 may be based on local area networking (LAN) and/or wide area networking (WAN) technology.

Once mobile device 335 obtains location information for light fixture 101C, mobile device 335 may then estimate a current location of mobile device 335, at least in relation to light fixture 101C. Such estimated location of mobile device 335 may then be utilized, for example, to inform a user of mobile device 335 of the estimated location (e.g., indication of estimated current location depicted on map displayed to user) or to retrieve or otherwise prompt information related to the estimated location to be shared with the user (e.g., directions based on estimated current location or information related to estimated current location).

FIG. 4 depicts an example of an alternate light fixture 101D. Light fixture 101D incorporates multiple elements 431A, 431B, 431C, 431D. Multiple elements 431A, 431B, 431C, 431D may collectively be interpreted as a single watermark or identification marking. Alternatively, each element may individually be interpreted as a watermark or identification marking (e.g., 431A=ID 1, 431B=ID 2, 431C=ID 3, 431D=ID 4). Multiple elements 431A, 431B, 431C, 431D of light fixture 101D provides, in one interpretation, an example of color "QR" codes in multiple locations 222 of FIG. 2. Again, given multiple light fixtures similar to light fixture 101D within a set of light fixtures for a space, changes to one or more of multiple elements 431A, 431B, 431C, 431D across the various light fixtures of the set allow each light fixture of the set to be uniquely identifiable.

Figure 5:
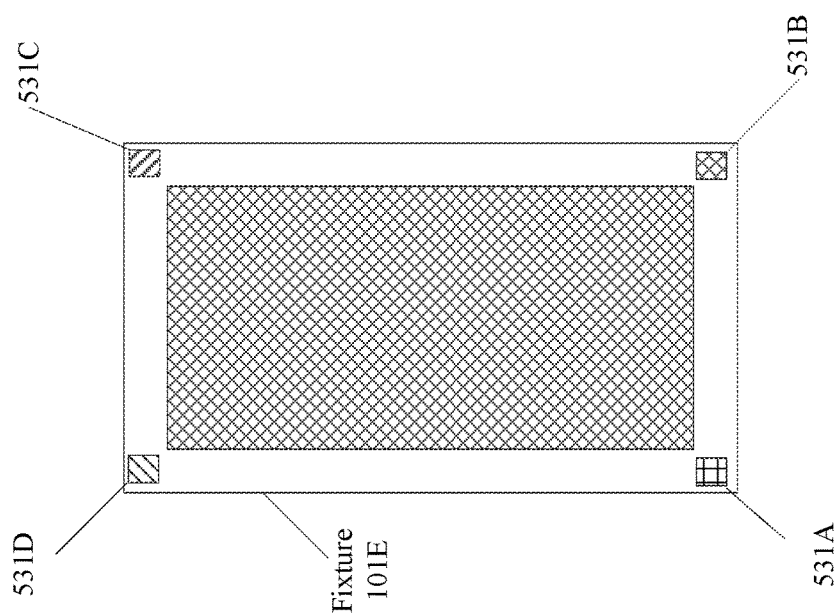
FIG. 5 is a simplified block diagram of an example of another alternate uniquely identifiable light fixture.

FIG. 5 illustrates an example of yet another alternative light fixture 101E. Light fixture 101E incorporates multiple elements 531A, 531B, 531C, 531D. While multiple elements 531A, 531B, 531C, 531D are depicted as each having a different pattern, this is only for simplicity given the black and white nature of the FIGs. Alternatively, multiple elements 531A, 531B, 531C, 531D will be, for example, different colors or different patterns of colors. Thus, light fixture 101E depicts, for example, a pattern of colors 214 in multiple locations 218 or multiple patterns of colors 220 from FIG.

Figure 6:
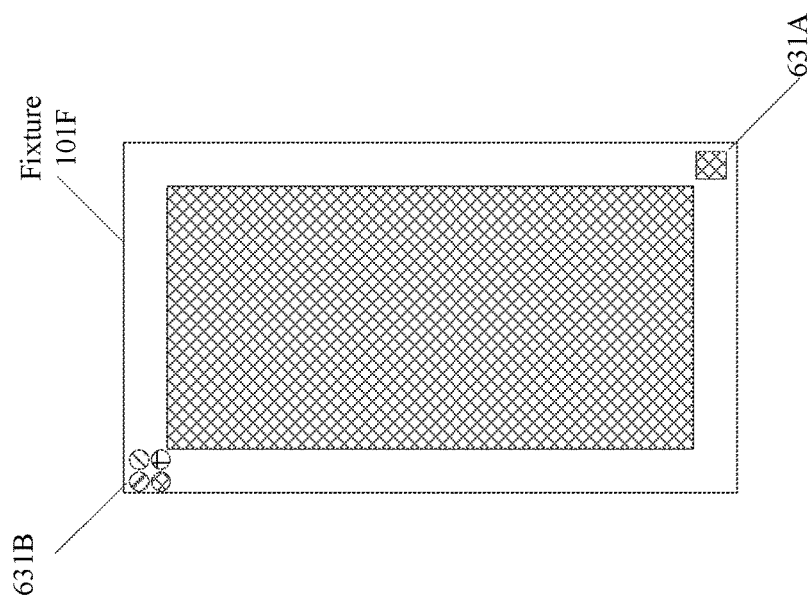
FIG. 6 is a simplified block diagram of an example of yet another alternate uniquely identifiable light fixture.

FIG. 6 illustrates an example of still another alternative light fixture 101F. Light fixture 101F incorporates multiple elements 631A, 631B. Unlike light fixtures 101D, 101E of FIGS. 4-5, element 631A has one form while element 631B has a different form. That is, light fixture 101F incorporates one element 631A that follows one unique identification option 202, such as multiple patterns of colors 220, as well as one element 631B that follows another unique identification option 202, such as a pattern of colors 214 in a specific location 216. In this way, multiple unique identification options 202 may be combined to enhance and expand the ability to uniquely identify a number of light fixtures similar to light fixture 101F.

While FIGS. 3-6 depict examples of light fixtures 101C, 101D, 101E, 101F incorporating color addition 210, FIGS. 7-8 depict examples of light fixtures 101G, 101H incorporating gradient addition 230. More specifically, light fixture 101G of FIG. 7 includes a single lens incorporating multiple patterns 703A, 703B, 703C, 703D, 703E. As such, light fixture 101G provides one example of multiple patterns within the same lens 236 of FIG. 2. In contrast to light fixture 101G of FIG. 7, light fixture 101H of FIG. 8 includes two lenses with each lens incorporating multiple patterns 803A, 803B, 803C, 803D, 803E. Of note, however, is that the order of the patterns changes between each of the two lenses.

Figure 9:
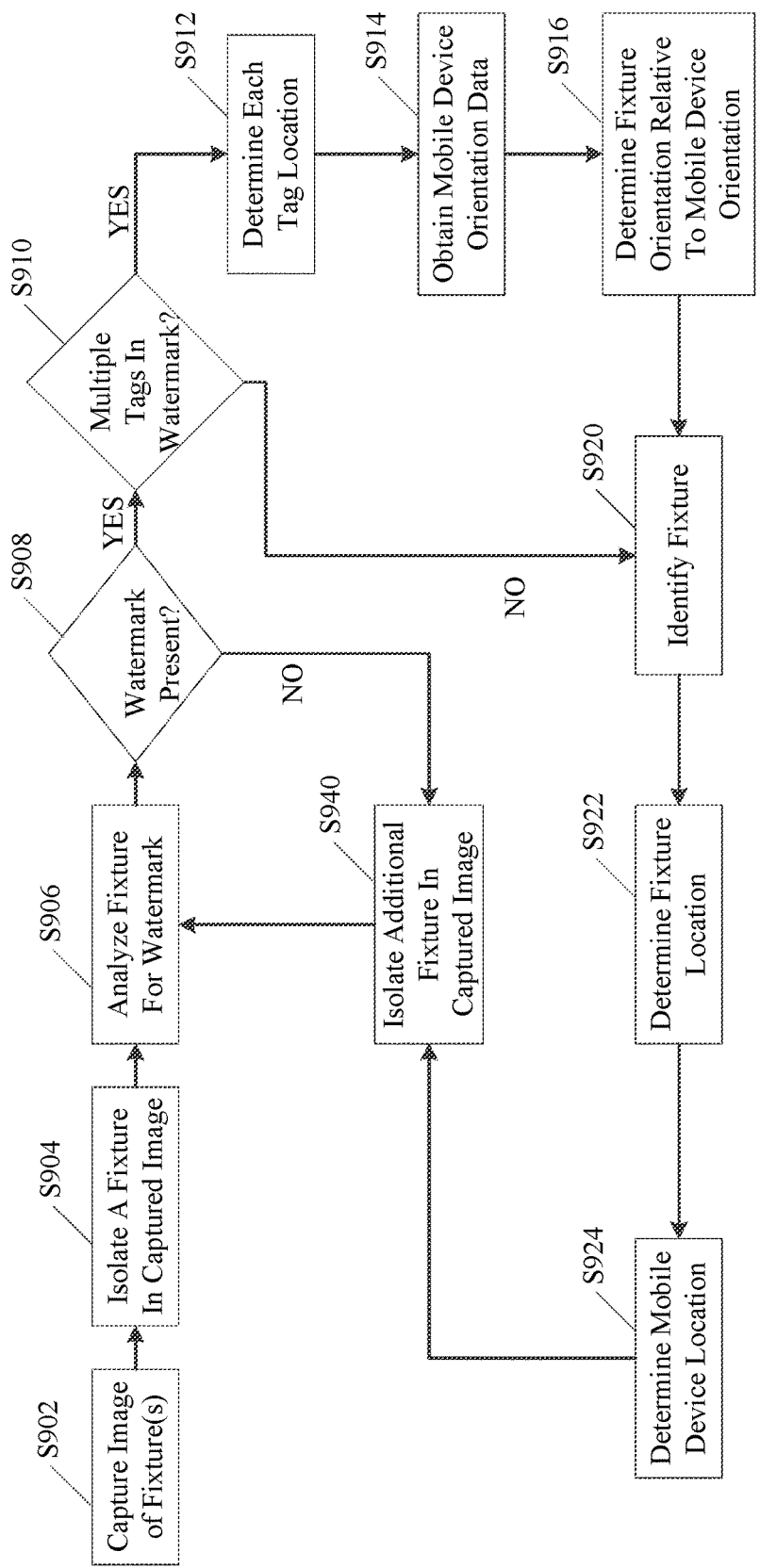
FIG. 9 is a simplified flow chart of an example of a process in which a uniquely identifiable light fixture is utilized to facilitate location estimation of a mobile device.

As can be seen from the above discussion related to FIGS. 2-8, various unique identification options 202 may be utilized to uniquely identify an individual light fixture. Given a predetermined location of a uniquely identifiable light fixture, a location of a mobile device may be estimated, at least in relation to the uniquely identifiable light fixture. FIG. 9 illustrates a flow chart of an example of a process for utilizing a uniquely identifiable light fixture to facilitate location estimation for a mobile device.

In step S902, the process begins by capturing an image of one or more light fixtures. For example, a mobile device operates an image sensor to capture an image that includes one or more light fixtures within the field of view of the sensor. The process may be commenced based on user input, such as a user launching an application on the mobile device; or the mobile device may start the process automatically without any user input, e.g. upon entry to a particular indoor space. Once an image is captured, the captured image is processed in step S904 to isolate a portion of the image containing a light fixture from within the captured image. As described above, such image processing, for example, occurs on or is otherwise performed by the mobile device. Alternatively, or in addition, such image processing may be performed by a server or other remote computer system.

Once a portion of the image containing a light fixture is isolated, the light fixture is analyzed for the presence of a watermark in step S906 and, in step S908, the process determines whether a watermark is present. If no watermark is present in the light fixture contained within the isolated portion of the image, the process continues to step S940, where an additional portion of the image containing an additional light fixture is isolated in the captured image. The process then returns to step S906 where the additional isolated portion of the image containing the additional light fixture is analyzed for a watermark.

If step S908 determines a watermark is present, step S910 determines whether the watermark includes multiple elements. If the watermark only includes a single element or tag, the process continues to step S920. Otherwise, the process continues to step S912.

A location of each element within the light fixture image is determined in step S912. Furthermore, orientation data of the mobile device is obtained in step S914. Then, in step S916, orientation of the light fixture relative to orientation of the mobile device is determined. Determination of light fixture orientation allows, for example, a reference point within the light fixture or watermark to be identified. Such reference point may contribute to or otherwise facilitate interpretation of the watermark and/or identification of the light fixture.

In step S920, the light fixture is identified. For example, if the present watermark is determined to be a single element watermark in step S910, that single element watermark is interpreted in step S920 to determine a unique identity for the light fixture. Alternatively, if the present watermark is determined to include multiple elements in step S910, that multiple element watermark is interpreted, based on orientation data provided as a result of steps S912-S916, in step S920 to determine a unique identity for the light fixture. In this way, the light fixture is uniquely identified as among a set of light fixtures within a space.

A location of the identified light fixture is determined in step S922. In one example, the unique identity of the identified light fixture is transmitted to a server or remote computer system via network communications. The server, upon receipt of the unique identity, may look for a record containing a matching unique identity within a database or other data store. The record containing the matching unique identity also contains, for example, data indicating or identifying a location of the identified light fixture. For example, the record may contain information specifying the known position for the identified light fixture relative to the space within which the light fixture is installed. Alternatively, such positional information may be related to a global position, such as latitude and longitude. Once the positional information is retrieved by the server, the server transmits the positional information back to the mobile device.

In an alternate example, such positional information is stored locally within the mobile device in conjunction with the unique identity. For example, upon entering a space, the mobile device downloads or otherwise acquires unique identities and corresponding positional information for all or some number of light fixtures within the space. In this alternate example, the mobile device reviews the locally stored information to determine the location of the light fixture.

Once the location of the light fixture is determined in step S922, step S924 utilizes the light fixture location to estimate a location of the mobile device. For example, a location relative to the light fixture is estimated based on the light fixture location. In some situations, the mobile device location may not be estimated based on identification of a single light fixture. For example, if the mobile device is not directly underneath or relatively near the identified light fixture, an estimation of the mobile device location may not be sufficiently accurate. In these situations, the process may return to step S940 where an additional light fixture is isolated in the captured image and continue as previously described. Otherwise, the process ends in step S924.

Although not explicitly depicted in FIG. 9, the process may be repeated as necessary. For example, as a user moves through a space, the process of FIG. 9 is performed after a predetermined time period (e.g., every 5 seconds, every 2 minutes, every ¼ of a second, etc.). In this way, the location of the mobile device is updated as the mobile device is moved around within the space.

As can be seen from the above discussion, location estimation of a mobile device can be facilitated by utilization of uniquely identifiable light fixtures. Although not shown, such passive identification of light fixtures may be enhanced by the addition of one or more forms of active identification, such as VLC-based identification. For example, passive identification as described herein is utilized to identify a first light fixture and active identification is utilized to identify a second light fixture. Then, locations of both light fixtures, based on both passive and active identification, may be utilized to estimate a location of the mobile device. In another example, both passive identification and active identification are utilized to identify a single light fixture. That is, the same light fixture contains a passive identification (e.g., a watermark) as well as an active identification (e.g., processing of information modulated onto emitted light, such as in visible light communication). Such use of both passive and active identification within a single fixture allows for a larger range of identifications within a single space.

The term "lighting device" as used herein is intended to encompass essentially any type of device that allows passage of natural light (e.g., a skylight) or processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of light emitting unit. The term "light fixture" as used herein refers to a lighting device in a form that is fixed in a location.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

Figure 10:
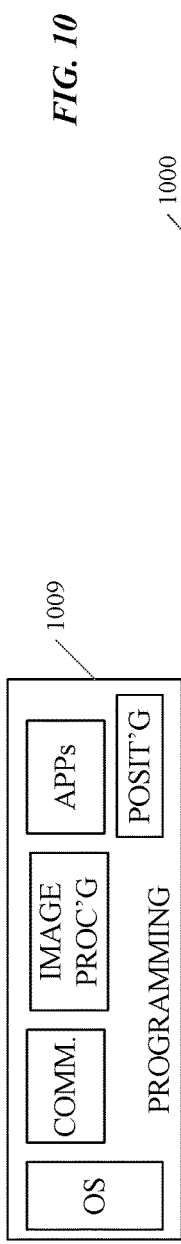
FIG. 10 is a simplified functional block diagram of a mobile device, by way of an example of a portable handheld device.

As shown by the above discussion, functions relating to the process of identifying a uniquely identifiable light fixture to facilitate mobile device location estimation may be implemented on a portable handheld device, which at a high level, includes components such as a camera, a processor coupled to the camera, to control camera operation and to receive image data from the camera, a memory coupled to be accessible to the processor, and programming in the memory for execution by the processor. The portable handheld device may be any of a variety of modern devices, such as a handheld digital music player, a portable video game or handheld video game controller, etc. In most examples discussed herein, the portable handheld device is a mobile device, such as a smartphone, a wearable smart device (e.g. watch or glasses), a tablet computer or the like. Those skilled in such hi-tech portable handheld devices will likely be familiar with the overall structure, programming and operation of the various types of such devices. For completeness, however, it may be helpful to summarize relevant aspects of a mobile device as just one example of a suitable portable handheld device. For that purpose, FIG. 10 provides a functional block diagram illustration of a mobile device 1000, which may serve as the device 335 in the system of FIG. 3.

In the example, the mobile device 1000 includes one or more processors 1001, such as a microprocessor or the like serving as the central processing unit (CPU) or host processor of the device 1000. Other examples of processors that may be included in such a device include math co-processors, image processors, application processors (APs) and one or more baseband processors (BPs). The various included processors may be implemented as separate circuit components or can be integrated in one or more integrated circuits, e.g. on one or more chips. For ease of further discussion, we will refer to a single processor 1001, although as outlined, such a processor or processor system of the device 1000 may include circuitry of multiple processing devices.

In the example, the mobile device 1000 also includes memory interface 1003 and peripherals interface 1005, connected to the processor 1001 for internal access and/or data exchange within the device 1000. These interfaces 1003, 1005 also are interconnected to each other for internal access and/or data exchange within the device 1000. Interconnections can use any convenient data communication technology, e.g. signal lines or one or more data and/or control buses (not separately shown) of suitable types.

In the example, the memory interface 1003 provides the processor 1001 and peripherals coupled to the peripherals interface 1005 storage and/or retrieval access to memory 1007. Although shown as a single hardware circuit for convenience, the memory 1007 may include one, two or more types of memory devices, such as high-speed random access memory (RAM) and/or non-volatile memory, such as read only memory (ROM), flash memory, micro magnetic disk storage devices, etc. As discussed more later, memory 1007 stores programming 1009 for execution by the processor 1001 as well as data to be saved and/or data to be processed by the processor 1001 during execution of instructions included in the programming 1009. New programming can be saved to the memory 1007 by the processor 1001. Data can be retrieved from the memory 1007 by the processor 1001; and data can be saved to the memory 1007 and in some cases retrieved from the memory 1007, by peripherals coupled via the interface 1005.

In the illustrated example of a mobile device architecture, sensors, various input output devices, and the like are coupled to and therefore controllable by the processor 1001 via the peripherals interface 1005. Individual peripheral devices may connect directly to the interface or connect via an appropriate type of subsystem.

The mobile device 1000 also includes appropriate input/output devices and interface elements. The example offers visual and audible inputs and outputs, as well as other types of inputs.

Although a display together with a keyboard/keypad and/or mouse/touchpad or the like may be used, the illustrated mobile device example 1000 uses a touchscreen 1011 to provide a combined display output to the device user and a tactile user input. The display may be a flat panel display, such as a liquid crystal display (LCD). For touch sensing, the user inputs would include a touch/position sensor, for example, in the form of transparent capacitive electrodes in or overlaid on an appropriate layer of the display panel. At a high level, a touchscreen displays information to a user and can detect occurrence and location of a touch on the area of the display. The touch may be an actual touch of the display device with a finger, stylus or other object; although at least some touchscreens can also sense when the object is in close proximity to the screen. Use of a touchscreen 1011 as part of the user interface of the mobile device 1000 enables a user of that device 1000 to interact directly with the information presented on the display.

A touchscreen input/output (I/O) controller 1013 is coupled between the peripherals interface 1005 and the touchscreen 1011. The touchscreen I/O controller 1013 processes data received via the peripherals interface 1005 and produces drive similar for the display component of the touchscreen 1011 to cause that display to output visual information, such as images, animations and/or video. The touchscreen I/O controller 1013 also includes the circuitry to drive the touch sensing elements of the touchscreen 1011 and processing the touch sensing signals from those elements of the touchscreen 1011. For example, the circuitry of touchscreen I/O controller 1013 may apply appropriate voltage across capacitive sensing electrodes and process sensing signals from those electrodes to detect occurrence and position of each touch of the touchscreen 1011. The touchscreen I/O controller 1013 provides touch position information to the processor 1001 via the peripherals interface 1005, and the processor 1001 can correlate that information to the information currently displayed via the display 1011, to determine the nature of user input via the touchscreen.

As noted, the mobile device 1000 in our example also offer audio inputs and/or outputs. The audio elements of the device 1000 support audible communication functions for the user as well as providing additional user input/output functions. Hence, in the illustrated example, the mobile device 1000 also includes a microphone 1015, configured to detect audio input activity, as well as an audio output component such as one or more speakers 1017 configured to provide audible information output to the user. Although other interfaces subsystems may be used, the example utilizes an audio coder/decoder (CODEC), as shown at 1019, to interface audio to/from the digital media of the peripherals interface 1005. The CODEC 1019 converts an audio responsive analog signal from the microphone 1015 to a digital format and supplies the digital audio to other element(s) of the device 1000, via the peripherals interface 1005. The CODEC 1019 also receives digitized audio via the peripherals interface 1005 and converts the digitized audio to an analog signal which the CODEC 1019 outputs to drive the speaker 1017. Although not shown, one or more amplifiers may be included in the audio system with the CODEC to amplify the analog signal from the microphone 1015 or the analog signal from the CODEC 1019 that drives the speaker 1017.

Other user input/output (I/O) devices 1021 can be coupled to the peripherals interface 1005 directly or via an appropriate additional subsystem (not shown). Such other user input/output (I/O) devices 1021 may include one or more buttons, rocker switches, thumb-wheel, infrared port, etc. as additional input elements. Examples of one or more buttons that may be present in a mobile device 1000 include a home or escape button, an ON/OFF button, and an up/down button for volume control of the microphone 1015 and/or speaker 1017. Examples of output elements include various light emitters or tactile feedback emitters (e.g. vibrational devices). If provided, functionality of any one or more of the buttons, light emitters or tactile feedback generators may be context sensitive and/or customizable by the user.

The mobile device 1000 in the example also includes one or more Micro ElectroMagnetic System (MEMS) sensors shown collectively at 1023. Such MEMS devices 1023, for example, can perform compass and orientation detection functions and/or provide motion detection, e.g. as part of step S914 in FIG. 9. In this example, the elements of the MEMS 1023 coupled to the peripherals interface 1005 directly or via an appropriate additional subsystem (not shown) include a gyroscope (GYRO) 1025 and a magnetometer 1027. The elements of the MEMS 1023 may also include a motion detector 1029 and/or an accelerometer 1031, e.g. instead of or as a supplement to detection functions of the GYRO 1025.

The mobile device 1000 in the example also includes a global positioning system (GPS) receiver 1033 coupled to the peripherals interface 1005 directly or via an appropriate additional subsystem (not shown). In general, a GPS receiver 1033 receives and processes signals from GPS satellites to obtain data about the positions of satellites in the GPS constellation as well as timing measurements for signals received from several (e.g. 3-5) of the satellites, which a processor (e.g. the host processor 1001 or another internal or remote processor in communication therewith) can process to determine the geographic location of the device 1000.

In the example, the mobile device 1000 further includes one or more cameras 1035 as well as camera subsystem 1037 coupled to the peripherals interface 1005. A smartphone or tablet type mobile station often includes a front facing camera and a rear or back facing camera. Some recent designs of mobile stations, however, have featured additional cameras. Although the camera 1035 may use other image sensing technologies, current examples often use charged coupled device (CCD) or a complementary metal-oxide semiconductor (CMOS) optical sensor. At least some such cameras implement a rolling shutter image capture technique. The camera subsystem 1037 controls the camera operations in response to instructions from the processor 1001; and the camera subsystem 1037 may provide digital signal formatting of images captured by the camera 1035 for communication via the peripherals interface 1005 to the processor or other elements of the device 1000.

The processor 1001 controls each camera 1035 via the peripherals interface 1005 and the camera subsystem 1037 to perform various image or video capture functions, for example, to take pictures or video clips in response to user inputs. The processor 1001 may also control a camera 1035 via the peripherals interface 1005 and the camera subsystem 1037 to obtain data detectable in a captured image, such as data represented by a code in an image or in visible light communication (VLC) detectable in an image. In the data capture case, the camera 1035 and the camera subsystem 1037 supply image data via the peripherals interface 1005 to the processor 1001, and the processor 1001 processes the image data to extract or demodulate data from the captured image(s).

Voice and/or data communication functions are supported by one or more wireless communication transceivers 1039. In the example, the mobile device includes a cellular or other mobile transceiver 1041 for longer range communications via a public mobile wireless communication network. A typical modern device, for example, might include a 4G LTE (long term evolution) type transceiver. Although not shown for convenience, the mobile device 1000 may include additional digital or analog transceivers for alternative wireless communications via a wide area wireless mobile communication network.

Many modern mobile devices also support wireless local communications over one or more standardized wireless protocols. Hence, in the example, the wireless communication transceivers 1039 also include at least one shorter range wireless transceiver 1043. Typical examples of the wireless transceiver 1043 include various iterations of WiFi (IEEE 802.11) transceivers and Bluetooth (IEEE 802.15) transceivers, although other or additional types of shorter range transmitters and/or receivers may be included for local communication functions.

As noted earlier, the memory 1007 stores programming 1009 for execution by the processor 1001 as well as data to be saved and/or data to be processed by the processor 1001 during execution of instructions included in the programming 1009. For example, the programming 1009 may include an operating system (OS) and programming for typical functions such as communications (COMM.), image processing (IMAGE PROC'G) and positioning (POSIT'G). Examples of typical operating systems include iOS, Android, BlackBerry OS and Windows for Mobile. The OS also allows the processor 1001 to execute various higher layer applications (APPs) that use the native operation functions such as communications, image processing and positioning.

In several of the above examples, mobile device 1000 may control camera 1035 and camera subsystem 1037 to capture an image and process, by processor 1001 and based on instructions stored in memory 1007 as part of programming 1009, the captured image to identify a uniquely identifiable light fixture included within the captured image. As described in greater detail above, mobile device 1000 may determine, based on the unique identifications, a location of the uniquely identifiable light fixture. For example, mobile device 1000 may utilize the wireless transceivers 1039 to transmit the unique identifications to a server and receive a corresponding location from the server. In turn, mobile device 1000 may determine, based on the location of the light fixture, a relative location of mobile device 1000. Once the relative location of the mobile device 1000 is determined, mobile device 1000, via touchscreen I/O controller 1013, may depict an indication of that location on touchscreen 1011 and/or present information about that location. Other location-related information, e.g. turn by run directions to a desired destination, may be presented via the touchscreen 1011. In this way, a location for mobile device 1000 may be determined and presented to a user of device 1000.

As shown by the above discussion, functions relating to the process of utilizing a uniquely identifiable light fixture to facilitate mobile device location determination may be implemented on computers connected for data communication via the components of a packet data network, operating as a server as shown in FIG. 3. Although special purpose devices may be used, such devices also may be implemented using one or more hardware platforms intended to represent a general class of user's data processing device commonly used to run "client" programming and/or a general class of data processing device commonly used to run "server" programming. The user device may correspond to mobile device 335 of FIG. 3 whereas the server computer may be configured to implement various location determination related functions as discussed above.

As known in the data processing and communications arts, a general-purpose computing device, computer or computer system typically comprises a central processor or other processing device, internal data connection(s), various types of memory or storage media (RAM, ROM, EEPROM, cache memory, disk drives etc.) for code and data storage, and one or more network interfaces for communication purposes. The software functionalities involve programming, including executable code as well as associated stored data, e.g. files used for the mobile device location determination service/function(s). The software code is executable by the general-purpose computer that functions as the server and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for utilizing a uniquely identifiable light fixture to facilitate mobile device location determination, in essentially the manner performed in the implementations discussed and illustrated herein. Although those skilled in the art likely are familiar with the structure, programming and general operation of such computer systems, it may be helpful to consider some high-level examples.

Figure 11:
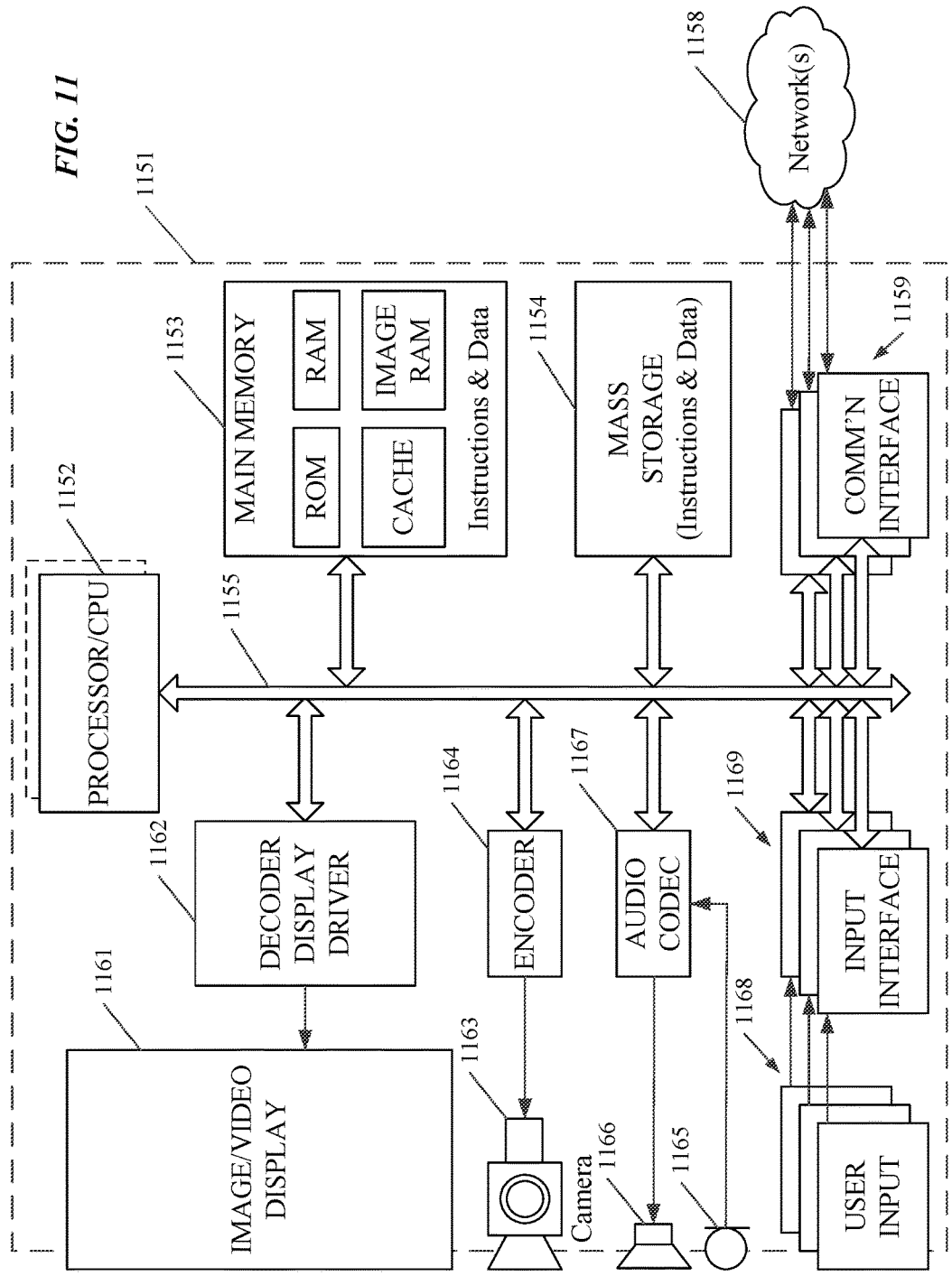
FIG. 11 is a simplified functional block diagram of a personal computer or other work station or terminal device.
Figure 12:
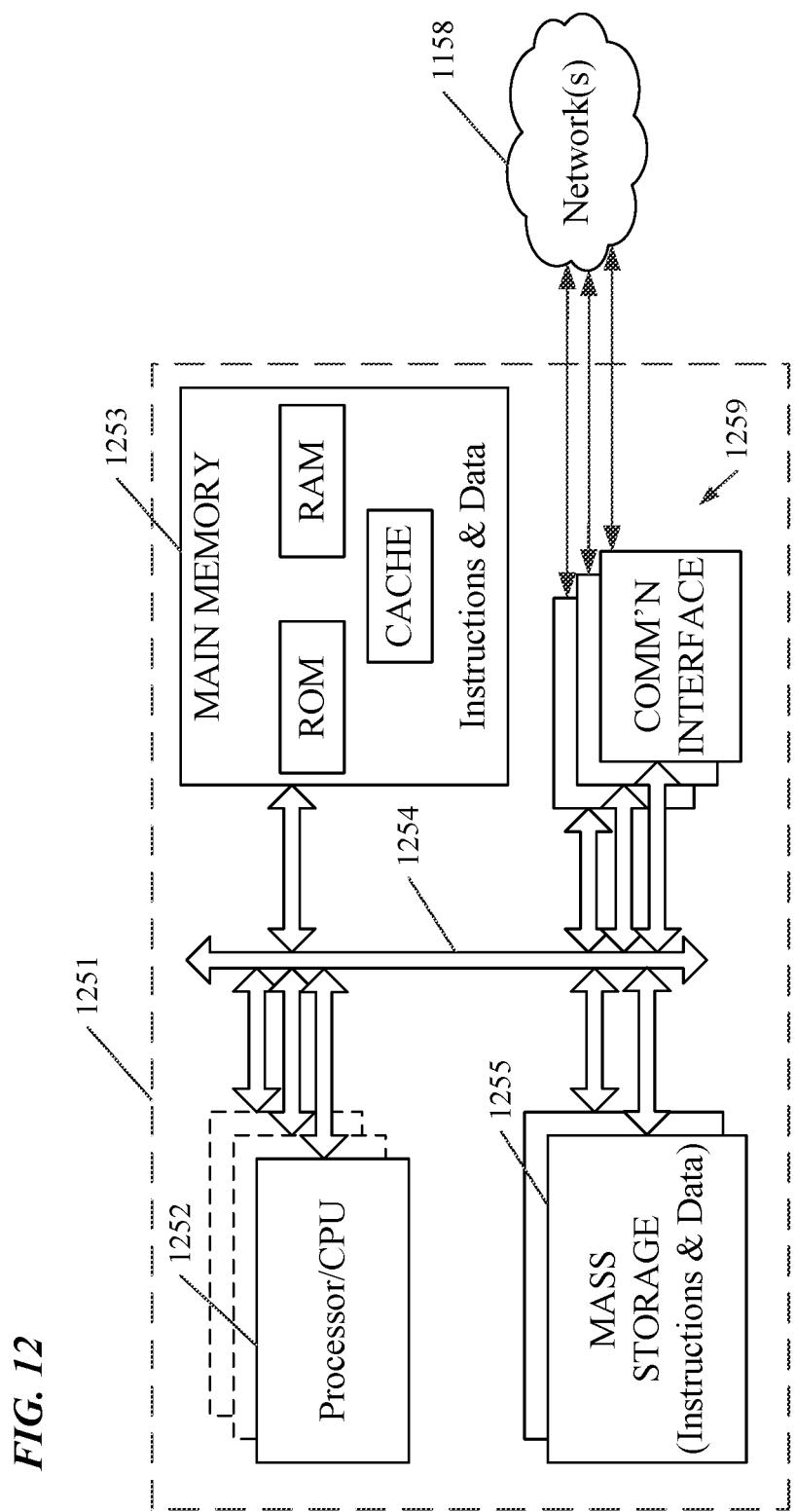
FIG. 12 is a simplified functional block diagram of a computer that may be configured as a host or server, for example, to function as the server in the system of FIG. 3.

FIGS. 11 and 12 provide functional block diagram illustrations of general purpose computer hardware platforms. FIG. 11 depicts a computer with user interface elements, as may be used to implement a client computer or other type of work station or terminal device, although the computer of FIG. 11 may also act as a host or server if appropriately programmed. FIG. 12 illustrates a network or host computer platform, as may typically be used to implement a server.

With reference to FIG. 11, a user device type computer system 1151, which may serve as a user terminal, includes processor circuitry forming a central processing unit (CPU) 1152. The circuitry implementing the CPU 1152 may be based on any processor or microprocessor architecture such as a Reduced Instruction Set Computing (RISC) using an ARM architecture, as commonly used today in mobile devices and other portable electronic devices, or a microprocessor architecture more commonly used in computers such as an Instruction Set Architecture (ISA) or Complex Instruction Set Computing (CISC) architecture. The CPU 1152 may use any other suitable architecture. Any such architecture may use one or more processing cores. The CPU 1152 may contain a single processor/microprocessor, or it may contain a number of microprocessors for configuring the computer system 1151 as a multi-processor system.

The computer system 1151 also includes a main memory 1153 that stores at least portions of instructions for execution by and data for processing by the CPU 1152. The main memory 1153 may include one or more of several different types of storage devices, such as read only memory (ROM), random access memory (RAM), cache and possibly an image memory (e.g. to enhance image/video processing). Although not separately shown, the memory 1153 may include or be formed of other types of known memory/storage devices, such as PROM (programmable read only memory), EPROM (erasable programmable read only memory), FLASH-EPROM, or the like.

The system 1151 also includes one or more mass storage devices 1154. Although a storage device 1154 could be implemented using any of the known types of disk drive or even tape drive, the trend is to utilize semiconductor memory technologies, particularly for portable or handheld system form factors. As noted, the main memory 1153 stores at least portions of instructions for execution and data for processing by the CPU 1152. The mass storage device 1154 provides longer term non-volatile storage for larger volumes of program instructions and data. For a personal computer, or other similar device example, the mass storage device 1154 may store the operating system and application software as well as content data, e.g. for uploading to main memory and execution or processing by the CPU 1152. Examples of content data include messages and documents, and various multimedia content files (e.g. images, audio, video, text and combinations thereof), Instructions and data can also be moved from the CPU 1152 and/or memory 1153 for storage in device 1154.

The processor/CPU 1152 is coupled to have access to the various instructions and data contained in the main memory 1153 and mass storage device 1154. Although other interconnection arrangements may be used, the example utilizes an interconnect bus 1155. The interconnect bus 1155 also provides internal communications with other elements of the computer system 1151.

The system 1151 also includes one or more input/output interfaces for communications, shown by way of example as several interfaces 1159 for data communications via a network 1158. The network 1158 may be or communicate with the network 337 of FIG. 3. Although narrowband modems are also available, increasingly each communication interface 1159 provides a broadband data communication capability over wired, fiber or wireless link. Examples include wireless (e.g. WiFi) and cable connection Ethernet cards (wired or fiber optic), mobile broadband 'aircards,' and Bluetooth access devices. Infrared and visual light type wireless communications are also contemplated. Outside the system 1151, the interfaces provide communications over corresponding types of links to the network 1158. In the example, within the system 1151, the interfaces communicate data to and from other elements of the system via the interconnect bus 1155.

For operation as a user terminal device, the computer system 1151 further includes appropriate input/output devices and interface elements. The example offers visual and audible inputs and outputs, as well as other types of inputs. Although not shown, the system may also support other types of output, e.g. via a printer. The input and output hardware devices are shown as elements of the device or system 1151, for example, as may be the case if the computer system 1151 is implemented as a portable computer device (e.g. laptop, notebook or ultrabook), tablet, smartphone or other handheld device. In other implementations, however, some or all of the input and output hardware devices may be separate devices connected to the other system elements via wired or wireless links and appropriate interface hardware.

For visual output, the computer system 1151 includes an image or video display 1161 and an associated decoder and display driver circuit 1162. The display 1161 may be a projector or the like but typically is a flat panel display, such as a liquid crystal display (LCD). The decoder function decodes video or other image content from a standard format, and the driver supplies signals to drive the display 1161 to output the visual information. The CPU 1152 controls image presentation on the display 1161 via the display driver 1162, to present visible outputs from the device 1151 to a user, such as application displays and displays of various content items (e.g. still images, videos, messages, documents, and the like).

In the example, the computer system 1151 also includes a camera 1163 as a visible light image sensor. Various types of cameras may be used. The camera 1163 typically can provide still images and/or a video stream, in the example to an encoder 1164. The encoder 1164 interfaces the camera to the interconnect bus 1155. For example, the encoder 1164 converts the image/video signal from the camera 1163 to a standard digital format suitable for storage and/or other processing and supplies that digital image/video content to other element(s) of the system 1151, via the bus 1155. Connections to allow the CPU 1152 to control operations of the camera 1163 are omitted for simplicity.

In the example, the computer system 1151 includes a microphone 1165, configured to detect audio input activity, as well as an audio output component such as one or more speakers 1166 configured to provide audible information output to the user. Although other interfaces may be used, the example utilizes an audio coder/decoder (CODEC), as shown at 1167, to interface audio to/from the digital media of the interconnect bus 1155. The CODEC 1167 converts an audio responsive analog signal from the microphone 1165 to a digital format and supplies the digital audio to other element(s) of the system 1151, via the bus 1155. The CODEC 1167 also receives digitized audio via the bus 1155 and converts the digitized audio to an analog signal which the CODEC 1167 outputs to drive the speaker 1166. Although not shown, one or more amplifiers may be included to amplify the analog signal from the microphone 1165 or the analog signal from the CODEC 1167 that drives the speaker 1166.

Depending on the form factor and intended type of usage/applications for the computer system 1151, the system 1151 will include one or more of various types of additional user input elements, shown collectively at 1168. Each such element 1168 will have an associated interface 1169 to provide responsive data to other system elements via bus 1155. Examples of suitable user inputs 1168 include a keyboard or keypad, a cursor control (e.g. a mouse, touchpad, trackball, cursor direction keys etc.).

Another user interface option provides a touchscreen display feature. At a high level, a touchscreen display is a device that displays information to a user and can detect occurrence and location of a touch on the area of the display. The touch may be an actual touch of the display device with a finger, stylus or other object; although at least some touchscreens can also sense when the object is in close proximity to the screen. Use of a touchscreen display as part of the user interface enables a user to interact directly with the information presented on the display. The display may be essentially the same as discussed above relative to element 1161 as shown in the drawing. For touch sensing, however, the user inputs 1168 and interfaces 1169 would include a touch/position sensor and associated sense signal processing circuit. The touch/position sensor is relatively transparent, so that the user may view the information presented on the display 1161. The sense signal processing circuit receives sensing signals from elements of the touch/position sensor and detects occurrence and position of each touch of the screen formed by the display and sensor. The sense circuit provides touch position information to the CPU 1152 via the bus 1155, and the CPU 1152 can correlate that information to the information currently displayed via the display 1161, to determine the nature of user input via the touchscreen.

A mobile device type user terminal may include elements similar to those of a laptop or desktop computer, but will typically use smaller components that also require less power, to facilitate implementation in a portable form factor. Some portable devices include similar but smaller input and output elements. Tablets and smartphones, for example, utilize touch sensitive display screens, instead of separate keyboard and cursor control elements.

Each computer system 1151 runs a variety of applications programs and stores data, enabling one or more interactions via the user interface, provided through elements, and/or over the network 1158 to implement the desired user device processing for the device location determination service based on a uniquely identifiable light fixture described herein or the processing of captured images for such device location determination services. The user computer system/device 1151, for example, runs a general purpose browser application and/or a separate device location determination application program.

Turning now to consider a server or host computer, FIG. 12 is a functional block diagram of a general-purpose computer system 1251, which may perform the functions of the server 337 in FIG. 3 or the like.

The example 1251 will generally be described as an implementation of a server computer, e.g. as might be configured as a blade device in a server farm. Alternatively, the computer system may comprise a mainframe or other type of host computer system capable of web-based communications, media content distribution, or the like via the network 1158. Although shown as the same network as served the user computer system 1151, the computer system 1251 may connect to a different network.

The computer system 1251 in the example includes a central processing unit (CPU) 1252, a main memory 1253, mass storage 1255 and an interconnect bus 1254. These elements may be similar to elements of the computer system 1151 or may use higher capacity hardware. The circuitry forming the CPU 1252 may contain a single microprocessor, or may contain a number of microprocessors for configuring the computer system 1252 as a multi-processor system, or may use a higher speed processing architecture. The main memory 1253 in the example includes ROM, RAM and cache memory; although other memory devices may be added or substituted. Although semiconductor memory may be used in the mass storage devices 1255, magnetic type devices (tape or disk) and optical disk devices typically provide higher volume storage in host computer or server applications. In operation, the main memory 1253 stores at least portions of instructions and data for execution by the CPU 1252, although instructions and data are moved between memory and storage and CPU via the interconnect bus in a manner similar to transfers discussed above relative to the system 1151 of FIG. 11.

The system 1251 also includes one or more input/output interfaces for communications, shown by way of example as interfaces 1259 for data communications via the network 1158. Each interface 1259 may be a high-speed modem, an Ethernet (optical, cable or wireless) card or any other appropriate data communications device. To provide the device location determination service to a large number of users' client devices, the interface(s) 1259 preferably provide(s) a relatively high-speed link to the network 1158. The physical communication link(s) may be optical, wired, or wireless (e.g., via satellite or cellular network).

Although not shown, the system 1251 may further include appropriate input/output ports for interconnection with a local display and a keyboard or the like serving as a local user interface for configuration, programming or troubleshooting purposes. Alternatively, the server operations personnel may interact with the system 1251 for control and programming of the system from remote terminal devices via the Internet or some other link via network 1158.

The computer system 1251 runs a variety of applications programs and stores the necessary information for support of the device location determination service described herein. One or more such applications enable the delivery of web pages and/or the generation of e-mail messages. Those skilled in the art will recognize that the computer system 1251 may run other programs and/or host other web-based or e-mail based services. As such, the system 1251 need not sit idle while waiting for device location determination service related functions. In some applications, the same equipment may offer other services.

The example (FIG. 12) shows a single instance of a computer system 1251. Of course, the server or host functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like 1151, 1251 generally are conventional in nature, and it is presumed that those skilled in the art are sufficiently familiar therewith to understand implementation of the present device location determination technique using suitable configuration and/or programming of such computer system(s) particularly as outlined above relative to 1151 of FIG. 11 and 1251 of FIG. 12.

Hence, aspects of the methods of identifying a uniquely identifiable light fixture to facilitate mobile device location estimation outlined above may be embodied in programming, e.g. in the form of software, firmware, or microcode executable by a user computer system or mobile device, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform that will be the server 337 of FIG. 3 and/or the computer platform of the user that will be the client device for the device location determination service. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the process of utilizing a uniquely identifiable light fixture to facilitate mobile device location determination, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A portable handheld device, comprising:
   an image sensor;
   a processor coupled to the image sensor, to control image sensor operation and to receive image data from the image sensor;
   a memory coupled to be accessible to the processor; and
   programming in the memory for execution by the processor to configure the portable handheld device to perform functions, including functions to:
      operate the image sensor to capture an image including an image representation of one light fixture from among a plurality of light fixtures configured to illuminate a space occupied by a user of the portable handheld device,
      the one light fixture having a passive, humanly imperceptible identification marking at a location physically on the one light fixture observable by the image sensor, the identification marking being optically detectable by the image sensor, and identification of the one light fixture represented by the identification marking being unique to only the one light fixture among the plurality of light fixtures configured to illuminate the space; and operate the processor in a visible light communication (VLC) mode in which receipt of modulated data from the one light source is expected to:
- receive data of the captured image from the image sensor;
- absent receipt of the modulated VLC data from the captured image, extract data of the unique identification marking on only the one light fixture that is isolated from the received data of the captured image to identify the one light fixture; and
- process the identification of the one isolated light fixture without using information from any other of the plurality of light fixtures to estimate a position of the portable handheld device in the space, based at least in part on a known position of the one light fixture in the space having the unique identification marking, wherein the known position is provided by previously obtained data having a location for each identification marking.

2. The portable handheld device of claim 1, wherein:
the portable handheld device further comprises a network interface coupled to the processor and configured to provide data communications via a data communications network; and
the function to process the identification of the one light fixture comprises functions to:
- transmit, via the network interface, the identification of the one light fixture; and
- receive, via the network interface, data specifying the known position of the one light fixture in the space.

3. The portable handheld device of claim 1, wherein:
the unique identification marking comprises a plurality of passive, humanly imperceptible elements at a plurality of different locations physically on the one light fixture observable by the image sensor, the plurality of elements being optically detectable by the image sensor;
execution of the programming in the memory by the processor further configures the portable handheld device to perform additional functions, including functions to:
- extract data of the elements from the received data of the captured image to identify the one light fixture;
- determine locations of the elements in the captured image;
- obtain data about orientation of the portable handheld device; and
- determine relative orientation of the one light fixture, with respect to the portable handheld device, based on the orientation of the portable handheld device and the determined locations of the elements in the captured image; and the function to estimate position of the portable handheld device in the space is further based on the determined relative orientation of the one light fixture.

4. The portable handheld device of claim 3, wherein:
the portable handheld device further comprises a microelectromechanical systems (MEMS) sensor coupled to the processor; and
the function to obtain the data about orientation of the portable handheld device comprises a function to obtain the data about orientation of the portable handheld device via the MEMS sensor.

5. The portable handheld device of claim 1, wherein execution of the programming in the memory by the processor further configures the portable handheld device to perform additional functions, including functions to:
- process data extracted from the received data of the captured image to obtain an identification of another of the plurality of light fixtures configured to illuminate the space, the identification of the other light fixture being unique to the other light fixture at least among the plurality of light fixtures configured to illuminate the space; and
- the function to process the identification of the one light fixture further comprises a function to process the identification of only the other light fixture without using information from any other of the plurality of light fixtures, the estimation of the position of the portable handheld device being based at least in part on the known position of the one light fixture in the space and a known position of the other light fixture in the space having the unique identification marking, wherein the known position is provided by previously obtained data having a location for each identification marking.

6. The portable handheld device of claim 5, wherein:
the portable handheld device further comprises a network interface coupled to the processor and configured to provide data communications via a data communications network; and
the function to process the identifications comprises functions to:
- transmit, via the network interface, the identification of the one light fixture and the identification of the other light fixture; and
- receive, via the network interface, data specifying the known position of the one light fixture in the space and data specifying the known position of the other light fixture in the space.

7. The portable handheld device of claim 5, wherein:
the other light fixture has a passive, humanly imperceptible identification marking at a location physically on the other light fixture observable by the image sensor, the identification marking being optically detectable by the image sensor; and
the function to process data to obtain the identification of the other light fixture includes a function to extract data of the unique identification marking on only the other light fixture that is isolated from the received data of the captured image to identify the other light fixture.

8. The portable handheld device of claim 5, wherein:
the other light fixture modulates a general illumination light output of the other light fixture with code representing the identification of the other light fixture; and
the function to process data to obtain the identification of the other light fixture includes a function to demodulate at least a portion of the captured image data corresponding to the other light fixture to recover the code representing the identification of the other light fixture.

9. A method, comprising:
operating an image sensor of a portable handheld device in a visible light communication (VLC) mode in which receipt of modulated data is expected to capture an image including an image representation of at least one light fixture from among a plurality of light fixtures configured to illuminate a space occupied by a user of the portable handheld device,
the one light fixture having a passive, humanly imperceptible identification marking at a location physically on the one light fixture observable by the image sensor, the identification marking being optically detectable by the image sensor, and identification of the one light fixture represented by the identification marking being unique to only the one light fixture among the plurality of light fixtures configured to illuminate the space;

receiving, by a processor of the portable handheld device and from the image sensor, data of the captured image;

absent receipt of the modulated VLC data from the captured image, extracting data of the unique identification marking on only the one light fixture that is isolated from the received data of the captured image to identify the one light fixture; and processing the identification of the one isolated light fixture without using information from any other of the plurality of light fixtures to estimate a position of the portable handheld device in the space, based at least in part on a known position of the one light fixture in the space having the unique identification marking, wherein the known position is provided by previously obtained data having a location for each identification marking.

10. The method of claim 9, wherein the step of processing the identification of the one light fixture further comprises:
transmitting, via a network interface of the portable handheld device, the identification of the one light fixture; and
receiving, via the network interface, data specifying the known position of the one light fixture in the space.

11. The method of claim 9, wherein:
the unique identification marking comprises a plurality of passive, humanly imperceptible elements at a plurality of different locations physically on the one light fixture observable by the image sensor, the plurality of elements being optically detectable by the image sensor;
the method further comprises:
extracting data of the elements from the received data of the captured image to identify the one light fixture;
determining locations of the elements in the captured image;
obtaining data about orientation of the portable handheld device; and
determining relative orientation of the one light fixture, with respect to the portable handheld device, based on the orientation of the portable handheld device and the determined locations of the elements in the captured image; and
processing the identification of the one light fixture to estimate position of the portable handheld device in the space is further based on the determined relative orientation of the one light fixture.

12. The method of claim 9, further comprising processing data extracted from the received data of the captured image to obtain an identification of another of the plurality of light fixtures configured to illuminate the space, the identification of the other light fixture being unique to the other light fixture at least among the plurality of light fixtures configured to illuminate the space, wherein:
processing the identification of the one light fixture further comprises processing the identification of the other light fixture, the estimation of the position of the portable handheld device being based at least in part on the known position of the one light fixture in the space and a known position of the other light fixture in the space.

13. The method of claim 12, wherein processing the identifications further comprises:
transmitting, via a network interface of the portable handheld device, the identification of the one light fixture and the identification of the other light fixture; and
receiving, via the network interface, data specifying the known position of the one light fixture in the space and data specifying the known position of the other light fixture in the space.

14. The method of claim 12, wherein:
the other light fixture has a passive, humanly imperceptible identification marking at a location physically on the other light fixture observable by the image sensor, the identification marking being optically detectable by the image sensor; and
processing data to obtain the identification of the other light fixture includes extracting data of the unique identification marking on only the other light fixture that is isolated from the received data of the captured image to identify the other light fixture.

15. The method of claim 12, wherein:
the other light fixture modulates a general illumination light output of the other light fixture with code representing the identification of the other light fixture; and
processing data to obtain the identification of the other light fixture includes demodulating at least a portion of the captured image data corresponding to the other light fixture to recover the code representing the identification of the other light fixture.

16. A tangible, non-transitory computer readable medium comprising a set of programming instructions, wherein execution of the set of programming instructions by a processor configures the processor to implement functions, including functions to:
operate an image sensor coupled to the processor to capture an image including an image representation of at least one light fixture from among a plurality of light fixtures configured to illuminate a space,
the one light fixture having a passive, humanly imperceptible identification marking at a location physically on the one light fixture observable by the image sensor, the identification marking being optically detectable by the image sensor, and identification of the one light fixture represented by the identification marking being unique to only the one light fixture among the plurality of light fixtures configured to illuminate the space; and
operate the processor in a visible light communication (VLC) mode in which receipt of modulated data is expected to:
receive data of the captured image from the image sensor;
absent receipt of the modulated VLC data from the captured image, extract data of the unique identification marking on only the one light fixture that is isolated from the received data of the captured image to identify the one light fixture; and
process the identification of the one isolated light fixture without using information from any other of the plurality of light fixtures to estimate a position of the light fixture in the space, based at least in part on a known position of the one light fixture in the space having the unique identification marking, wherein the known position is provided by previously obtained data having a location for each identification marking.

17. The computer readable medium of claim 16, wherein:
the unique identification marking comprises a plurality of passive, humanly imperceptible elements at a plurality of different locations physically on the one light fixture observable by the image sensor, the plurality of elements being optically detectable by the image sensor;
execution of the set of programming instructions by the processor further configures the processor to perform additional functions, including functions to:
  extract data of the elements from the received data of the captured image to identify the one light fixture;
  determine locations of the elements in the captured image;
  obtain data about orientation of the image sensor; and
  determine relative orientation of the one light fixture, with respect to the image sensor, based on the orientation of the image sensor and the determined locations of the elements in the captured image; and
the function to estimate position of the processor in the space is further based on the determined relative orientation of the one light fixture.

18. The computer readable medium of claim 16, wherein execution of the set of programming instructions by the processor further configures the processor to perform additional functions, including functions to:
  process data extracted from the received data of the captured image to obtain an identification of another of the plurality of light fixtures configured to illuminate the space, the identification of the other light fixture being unique to the other light fixture at least among the plurality of light fixtures configured to illuminate the space; and
  the function to process the identification of the one light fixture further comprises a function to process the identification of the other light fixture, the estimation of the position of the processor being based at least in part on the known position of the one light fixture in the space and a known position of the other light fixture in the space.

19. The computer readable medium of claim 18, wherein:
the other light fixture has a passive, humanly imperceptible identification marking at a location physically on the other light fixture observable by the image sensor, the unique identification marking being optically detectable by the image sensor; and
the function to process data to obtain the identification of the other light fixture includes a function to extract data of the unique identification marking on only the other light fixture that is isolated from the received data of the captured image to identify the other light fixture.

20. The computer readable medium of claim 18, wherein:
the other light fixture modulates a general illumination light output of the other light fixture with code representing the identification of the other light fixture; and
the function to process data to obtain the identification of the other light fixture includes a function to demodulate at least a portion of the captured image data corresponding to the other light fixture to recover the code representing the identification of the other light fixture.

21. The portable handheld device of claim 1, wherein the identification marking for each of the plurality of light fixtures configured to illuminate a space is a single element physically located on the light fixture.

22. The portable handheld device of claim 1, wherein the identification marking on each of the plurality of light fixtures configured to illuminate the space is different within a set of the plurality of light fixtures in the space.

23. The portable handheld device of claim 1, wherein the identification marking includes multiple groups of elements located physically on and across the one light fixture with each group of elements including multiple elements located in close proximity.

24. The method of claim 9, wherein the identification marking for each of the plurality of light fixtures configured to illuminate a space is a single element physically located on the light fixture.

25. The method of claim 9, wherein the identification marking for each of the plurality of light fixtures configured to illuminate a space is different within a set of the plurality of light fixtures in the space.

26. The method of claim 9, wherein the identification marking includes multiple groups of elements located across the one light fixture with each group of elements including multiple elements located in close proximity.

27. The computer readable medium of claim 16, wherein the identification marking for each of the plurality of light fixtures configured to illuminate a space is a single element physically located on the light fixture.

28. The computer readable medium of claim 16, wherein the identification marking for each of the plurality of light fixtures configured to illuminate the space is different within a set of the plurality of light fixtures in the space.

29. The computer readable medium of claim 16, wherein the identification marking includes multiple groups of elements located across the one light fixture with each group of elements including multiple elements located in close proximity.

30. The portable handheld device of claim 1, wherein the identification marking is located on a bezel of the light fixture.

31. The portable handheld device of claim 1, wherein the identification marking includes a gradient alteration to a lens of the light fixture.

* * * * *